US006034721A

United States Patent [19]

Mangeat et al.

[11] Patent Number: 6,034,721

[45] Date of Patent: Mar. 7, 2000

[54] CINEMATOGRAPHIC FILM ANALYSIS METHOD IN A FILM SCANNER APPARATUS

[75] Inventors: Frederic Mangeat, Crolles; Alain Bellet, Jarrie; Jean-Pierre Beauviala, Grenoble, all of France

[73] Assignee: Aaton, Grenoble, France

[21] Appl. No.: 08/845,344

[22] Filed: Apr. 14, 1997

[30] Foreign Application Priority Data

Apr. 15, 1996 [FR] France .................................. 96 04888

[51] Int. Cl.[7] .............................. H04N 3/36; H04N 17/00

[52] U.S. Cl. ............................ 348/97; 348/188; 348/189

[58] Field of Search ................................. 348/96, 97, 98, 348/104, 188, 189

[56] References Cited

U.S. PATENT DOCUMENTS

| | | | |
|---|---|---|---|
| 4,575,124 | 3/1986 | Morrison | 348/188 |
| 4,991,007 | 2/1991 | Corley | 348/188 |
| 5,428,387 | 6/1995 | Galt et al. | 348/98 |
| 5,917,987 | 6/1999 | Neyman | 348/97 |

OTHER PUBLICATIONS

Kennel, G., *SMPTE Journal,* Digital Film Scanning and Recording: The Technology and Practice, vol. 103, No. 3, pp. 174–181, Mar. 1, 1994.

French Search Report for FR 9604888, dated Dec. 20, 1996.

*Primary Examiner*—Vu Le
*Assistant Examiner*—Allen Wong
*Attorney, Agent, or Firm*—Arthur L. Plevy; Buchanan Ingersoll PC

[57] ABSTRACT

An analysis method for cinematographic film uses a film scanner for converting the images of the film into video images, the film scanner having a calibration mode providing a standardized video reproduction of films and a manual mode allowing the operator to adjust the film scanner for improving the visual quality of the video images it produces. The method comprises the steps of: a) filming a reference surface under desired lighting conditions to produce a film portion; b) using the film scanner in calibration mode to convert the film portion into video images; c) measuring the mean luminance and chrominance values of a portion of the reference surface in the video images produced in the calibration mode; d) using the film scanner in the manual mode to convert the film portion into video images with desired luminance and chrominance adjustments; e) measuring the mean luminance and chrominance values of a portion of the reference surface in the video images produced in the manual mode; and f) providing information on the mean values obtained in the manual mode relative to the mean values obtained in the calibration mode.

11 Claims, 3 Drawing Sheets

10
14
12'
16
96/21/04
17
11 : 27 : 57 : 03
18
R29 G21 B20
19
Δ:R-04 G+04 B+05

CINEMATOGRAPHIC FILM ANALYSIS METHOD IN A FILM SCANNER APPARATUS

FIELD OF THE INVENTION

The present invention relates to a method for analyzing the exposure conditions of negative cinematographic film, in order to correct its reproduction on positive film or on video tape.

DISCUSSION OF THE RELATED ART

Cinematographic film is generally shot on negative stock. The film must then be viewed by the director of photography and others, in order to determine whether or not the shots are acceptable. For this, rushes are usually printed on positive stock.

With the rushes, additional information is provided regarding the "printer light"; this information is exploited in particular by the director of photography in order to determine whether or not the shots were exposed satisfactorily. The "printer light" corresponds to the settings that must be adopted by the red, green and blue lamps of a standard printer to obtain a correctly exposed positive print. The "printer light" data is provided on a scale of 0 to 50, with the value of 25 corresponding to ideal exposure, and higher and lower values corresponding respectively to over- and underexposure.

Currently for practical reasons and for cost, there is a tendency to abandon rushes in favor of video images transferred onto magnetic tape directly from the film negative. The apparatus which makes this transfer possible is usually called film scanner or "telecinema".

The film scanner operator (or colorist) must set the film scanner apparatus, not only to correct the defects of the original negative exposure, but also in order to correct the visual aspect of the video images so as to compensate for the lack of contrast and color of the video images as opposed to the film images.

The director of photography, therefore, has only video images at his disposal in order to assess the conditions in which the film was exposed, without "printer light" data. The video images, even if the colorist did no more than correct the exposure defects of the film, are not entirely reliable; they cannot be usefully exploited, and are not predictive of the overall quality of the final positive print.

SUMMARY OF THE INVENTION

One object of the present invention is to supply reliable information on the exposure conditions of the negative stock once the film has been transferred onto video tape by means of a film scanner apparatus.

Another object of the present invention is to supply easily exploitable data regarding the settings the colorist made on the film scanner in order to improve the visual aspect of the video images.

These objects are achieved by an analysis method for cinematographic film using a film scanner for converting the images of the film into video images, the film scanner having a calibration mode providing a standardized video reproduction of films and a manual mode allowing the operator to adjust the film scanner for improving the visual quality of the video images it produces, comprising the following steps:

a) filming a reference surface under desired lighting conditions to produce a film portion;

b) using the film scanner in calibration mode to convert the film portion into video images;

c) measuring the mean luminance and chrominance values of a portion of the reference surface in the video images produced in the calibration mode;

d) using the film scanner in the manual mode to convert the film portion into video images with desired luminance and chrominance adjustments;

e) measuring the mean luminance and chrominance values of a portion of the reference surface in the video images produced in the manual mode; and f) providing information on the mean values obtained in the manual mode relative to the mean values obtained in the calibration mode.

In principle, the desired luminance and chrominance adjustments are achieved to correct the video image of the reference surface so that it corresponds to a standardized video image of a neutral gray reference card.

In certain cases, the camera operator purposely over or underexposes the film in order to give a certain atmosphere to the scene. For example, he may underexpose the film so as to simulate dark in daylight. He may also use color filters or colored lighting to give the image a particular aspect: warmer, colder, artificial.

When the film is transferred to video tape, as described above, over- and underexposure, or intentional hue changes are canceled out by the colorist, who will naturally attempt to correct the measures on the reference surface so as to bring them to the values corresponding to correct exposure. This is of course not what the camera operator was aiming at. Even if the colorist gives an indication of the corrections he made, this does not make it possible to "see" the desired result, and given the non-linearities of the procedures involved, it does not allow an automatic return to the desired "special effect".

To avoid this inconvenience, a feature of a preferred embodiment of the invention is to film scenes in which a "decoy surface" is inserted, presenting a distortion complementary to a desired effect. In attempting to rebalance the neutral gray, the colorist, unaware that it is a decoy and not a neutral reference surface, will respect or produce the desired distortion, depending upon whether filters were used or not.

The foregoing and other objects, features, aspects and advantages of the invention will become apparent from the following detailed description of embodiments, given by way of illustration and not of limitation with reference to the accompanying drawings.

DESCRIPTION OF THE PREFERRED EMBODIMENTS

In order to supply data corresponding to the traditional "printer light", it must be possible to calibrate a film scanner apparatus so that it provides a faithful standardized video reproduction of the original film. In other words, whichever film scanner is used, and whichever film is used, the calibrated film scanner must produce video images with similar characteristics from films exposed in similar conditions. An example of such film scanner calibration will be described later.

In a film scanner apparatus thus calibrated, it becomes possible to obtain reliable data on the film exposure by use of a neutral gray card of the type of those used to set the lighting of a scene. Such gray cards have a mean diffusion value of 18%, which corresponds to the mean luminosity of most images. It so happens that the "printer light" values corresponding to such a card have an ideal value of about 25.

The present invention is based on the use of a film scanner apparatus calibrated as indicated above, in order to analyze the standardized video image of a neutral gray card that was filmed in the desired lighting conditions. The red, green and blue (RGB) components of the analyzed pixels constitute faithful indications of the film exposure, since they were standardized by the calibration so as to be independent of the filmstock and the film scanner apparatus used. An equivalence, which will be called "transfer points", can therefore be set out between the standardized RGB components and the "printer lights". For example, the same 0 to 50 scale may be used for the "transfer points", with the value of 25 attributed to an ideal exposure of the neutral gray card.

Figure 1:
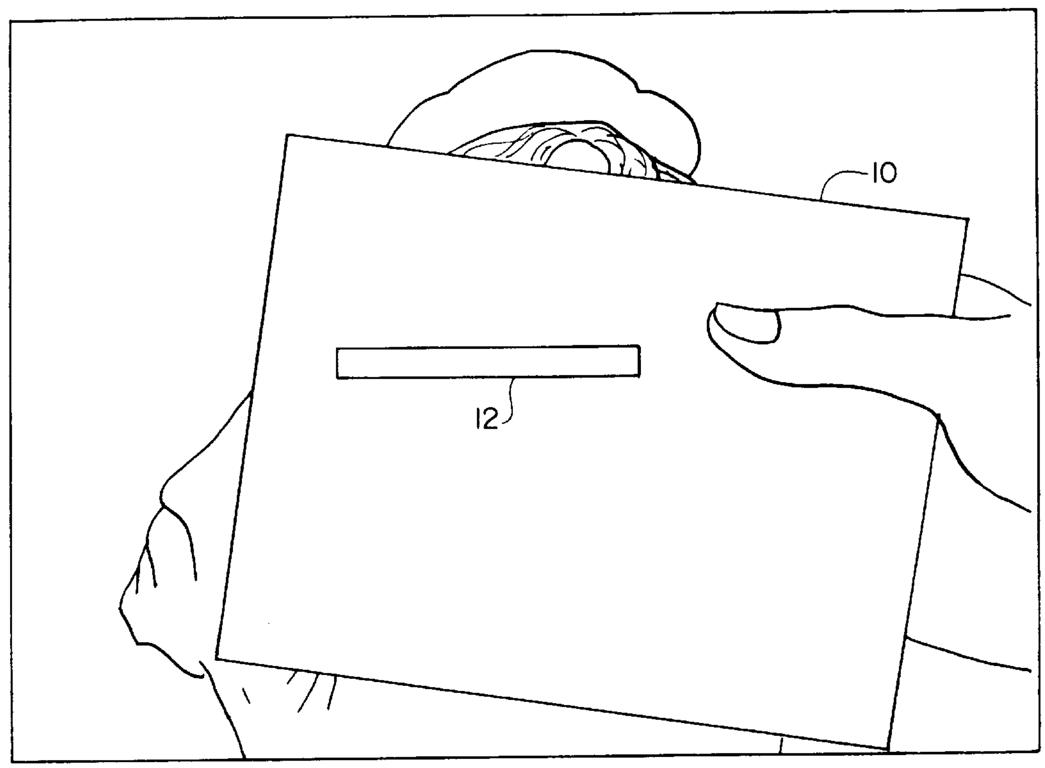
FIG. 1 represents a video image illustrating the use of a reference card at the center of a shot so as to obtain, in a film scanner, reliable data on the film exposure.

FIG. 1 illustrates an example of the utilization of a neutral gray card to obtain the aforementioned "transfer points". The card 10 is placed in the center of the shot, and filmed for a few seconds at the beginning of the shot. As the film passes through the film scanner apparatus, the colorist stops on the image containing the card 10. Thus, in a standardized video image, a central zone 12 which is entirely included in the card 10 is analyzed. The "transfer points" correspond to the mean RGB components of the pixels in zone 12, brought down to a scale of 0 to 50, for example. The RGB components are, if need be, shifted in relation to each other in order to improve the equivalence between the "transfer points" and the "printer lights".

The drawback of the foregoing procedure is that the neutral gray card must occupy a large part of the image in order to guarantee that it will include the entire zone of analysis 12. This means the card 10 must be placed close to the camera lens, where the lighting conditions are not necessarily those of the scene.

Though the card 10 is brought up closer, there is a fair likelihood that the zone of analysis 12 may go over the edge of the card, may interfere with the thumb of the person holding the card, or include a defect in the card, such as a stain. In this case, the measurement is incorrect.

Figure 2:
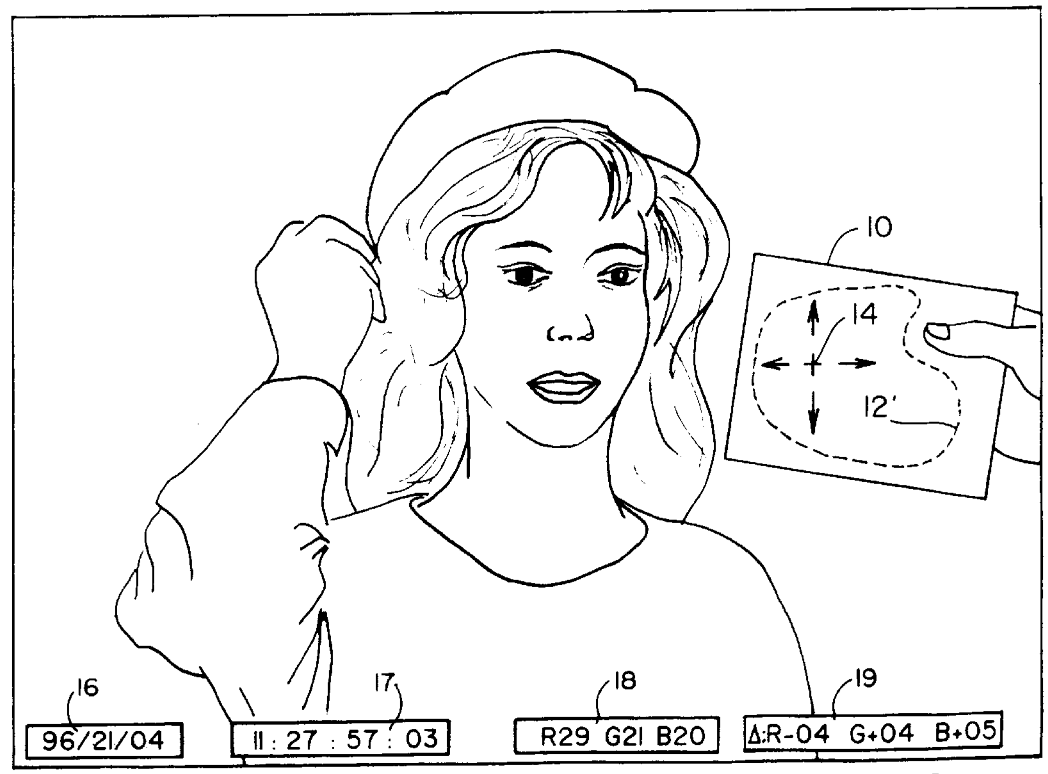
FIG. 2 represents a video image meant to illustrate the method of the invention in an advantageous application in which the reference card may be placed anywhere in the image.

FIG. 2 is meant to illustrate a first aspect of the method of the invention, allowing these drawbacks to be avoided. The card 10 is placed anywhere in the shot, in a position where the lighting conditions effectively correspond to those of the scene.

As previously, the card 10 is filmed for a few seconds at the beginning of a shot, and when the film passes through the film scanner apparatus, the colorist stops on a video image, such as the one in FIG. 2, containing the card 10.

A software will display a cursor 14 on the video image, and allow the colorist to move this cursor 14 at will. The colorist will move this cursor 14 to the card 10, which can be placed anywhere in the image. The cursor 14 selects a reference pixel around which a dynamic analysis zone 12' is sought. This dynamic zone 12' is preferably a zone of equiluminance and equichrominance consisting of contiguous pixels whose chrominance and luminance are in a close range around the luminance of the reference pixel 14.

Preferably, the zone 12' is displayed on the video image, which allows the colorist to check that the reference pixel was selected correctly. In effect, if the reference pixel was chosen on a characteristic point of the card 10, the zone 12' should extend to nearly the whole card. On the other hand, if the reference pixel 14 is situated on a singular point of the card, for example on a stain, the zone of analysis 12' covers only a part of the stain, and therefore a small part of the surface of card 10.

The function allowing selection of a zone of equiluminance and equichrominance, such as zone 12, is traditionally used in the field of image processing software, such as Adobe's "Photoshop". For example, the RGB values of the reference pixel are initially sampled, and a variation range around these values is defined. Then, each of the pixels adjacent to the reference pixel is analyzed, and those whose values are in that range are selected. The selected pixels define the current borders of the zone 12'. A recursive processing is further used to select, among the adjacent external pixels, those whose values are within the range in order to constitute a new current border.

In order to simplify the computation, an extension of the analysis zone 12' may be confined to an area containing enough pixels to supply representative measurements.

Furthermore, recent films have coded information on their edges, for example in the form of bar-codes. Data concerning the type of rawstock and footage information are placed thereon by the rawstock manufacturer. The camera may also record data on the film, such as date, camera number, etc.

In order to read all this data, there are several systems which are associated to a film scanner apparatus, such as the one called "Keylink" manufactured by Aaton. Such a system makes it possible to display the data present on the film in windows on the video image produced by a film scanner apparatus. As an example, FIG. 2 represents a window 16 indicating the date of the shot, and a window 17 indicating the time of the shot. With such a system, a window 18 may advantageously indicate the "transfer points" corresponding to the zone 12 analyzed on the neutral gray card 10. The window 18 represented in FIG. 2 indicates, as an example, the values 29, 21 and 20 respectively for the RGB components.

As indicated above, a calibrated film scanner apparatus is meant to produce standardized video images from a film. However, these standardized images, even if the film was correctly exposed, are not generally optimal for a video display. The colorist's role is in fact to make the video images easier to exploit, or more pleasant to look at.

Therefore, the film scanner has a calibration mode in which it produces standardized video images, and a manual mode in which the colorist's settings—and not the calibration—prevail. The film scanner apparatus will generally be used in manual mode to preview the film, and in calibration mode to analyze the gray card 10 appearing, for example, at the beginning of each shot. Of course, the "transfer points" 18 obtained by analysis of the card 10 in calibration mode will provide precious help to the colorist, who will be able to use them in order to make his own settings in manual mode.

Similarly, the settings made by the colorist in manual mode, in order to improve the video image, will constitute precious information for the director of photography, who will be able to take these corrections into account when the final film positive is printed.

Thus, the present invention provides for analysis of the card 10 in calibration mode, then in manual mode once the colorist has made his settings. The "transfer points" obtained in the analysis in manual mode are for example displayed in the window 19 and expressed as a differential with respect to the values obtained in calibration mode (window 18).

The procedure described in relation with FIG. 2 requires the film movement to be stopped at the beginning of each shot in order to move the cursor 14 onto the gray card 10. In certain situations, this can be too time-consuming. In this case, the present invention offers an alternative in which the cursor 14 is disposed permanently in the center of the image. At the beginning of each shot, the neutral gray card will be placed somewhere in the center of the image, as in FIG. 1. It will in fact be easier to place the card 10 than in the procedure described relating to FIG. 1. Indeed, it will be sufficient if the cursor 14, a point in the center of the image, is anywhere on the card 10; this is not constraining, and allows the card 10 to be placed farther from the camera in a location more representative of the lighting of the scene. Even if the cursor 14 is near the edge of the card, the analysis zone 12' will extend automatically towards the center of the card, so that a representative analysis of the card will always be obtained.

The film scanner operator will then be able to view the film continuously, and all he will have to do is order an analysis, for example by pushing a button, every time he sees a shot with a neutral gray card. The system will be designed so that, when this order is received, it will switch from manual to calibration mode, achieve the analysis, switch back to manual mode, achieve a second analysis so as to obtain the differential values of window 19, and finally continue the transfer of the film onto magnetic tape.

The drawback of this alternative embodiment, however, is that the operator cannot be certain that the cursor 14 is on a point sufficiently characteristic of card 10.

In the procedures just described, the colorist makes the settings, in manual mode, to obtain video images that are exploitable, or with enhanced visual quality. These settings do not take into account intentional overexposure, underexposure, or coloring realized by the camera operator, who made these adjustments specifically to give the scene a particular atmosphere. The effect desired by the camera operator will thus be canceled out by the colorist.

In order to solve this problem, it is proposed, in accordance with a second aspect of the present invention, to substitute for the 18% neutral gray card an active or passive "decoy surface" whose optical characteristics are complementary to those desired for the specific effect, and to make the shot in either selected or neutral conditions.

This decoy surface may be "passive", i.e. like the aforementioned neutral gray card, composed of a light diffusing material. This decoy surface may also be "active", i.e. constituted of a photo-emitting element that creates a given light on a display.

Thus the colorist, in analyzing the "decoy surface", which he will treat as a neutral reference card with the film scanner, will naturally make settings, either to create the luminance/chrominance distortion that the director of photography wanted in the image, or respect the intended distortion if the image was shot with filters and/or specific f-stops and adapted decoy surfaces.

A plurality of decoy cards may be provided as passive surfaces, each corresponding to a desired lighting or hue intensification. The camera operator will have this set of cards, just as he always has a set of filters. To facilitate selection, given that the hue of the card is the complement of the desired effect, it will be advantageous to place on the edge or the back of each card an indication of the effect that will be obtained by using it. For example, on the back of the card there could be one or several pairs of characteristic shots: unprocessed, and processed according to the effect obtained by using the card.

Provision may also be made for cards having several hues and/or gray levels, with the selected hue pinpointed so as to be identified subsequently by the colorist.

Figure 3A:
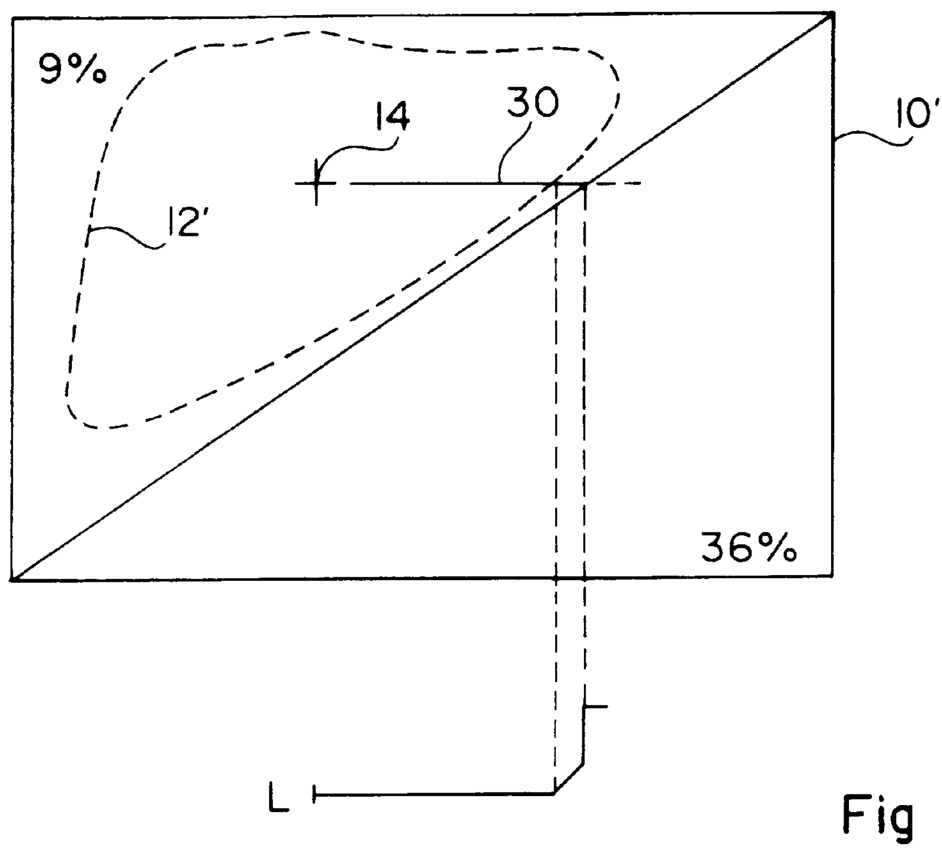
FIG. 3A represents an embodiment of the reference card to be used in the method of the invention in order to avoid canceling out intentional under- or overexposure.

FIG. 3A shows one embodiment of a decoy card 10' which could be used to define a specific overexposure or underexposure. The card 10' has two gray zones on either side of a diagonal line. One of the zones has a 9% reflection value, for example, corresponding to underexposure of one f-stop relative to a gray zone value of 18%. The other gray zone has a reflection value of 36%, for example, corresponding to an overexposure of one f-stop.

At the beginning of the shot, the card 10' is placed in front of the camera in a predetermined manner, depending on the intentional under- or overexposure. For example, to obtain underexposure, the card 10' is placed with the 9% area on top; for overexposure, the 36% zone is on top.

During calibration analysis mode as described in relation with FIG. 2, the operator will know that he should always place the cursor 14 in the upper area of the card 10'. If the 9% zone is at the top and the film was underexposed by one stop, the 9% area is darkened on the video image so as to correspond to an 18% zone. Thus, the "transfer points" will indicate correct exposure.

Conversely, if the 36% zone is at the top and the film was overexposed by one stop, this 36% zone will appear lighter on the video image, and will correspond to an 18% zone. Thus, the transfer points 18 will also indicate correct exposure.

It may be useful to indicate to those involved that the camera operator intentionally overexposed the film. An example of a method to obtain an indication of intentional over- or underexposure in the case of a card such as the one in FIG. 3A appears in this FIG. 3A, where a luminosity curve L is shown below the card 10'.

Starting from the cursor 14 in the first gray zone, luminosity measurements are made on the pixels of a line 30 going towards the second gray zone which is situated below the diagonal line in the example represented. These luminosity measurements are illustrated by the curve L. The luminosity is practically constant within the zone 12'. When the border of the zone 12' is reached, the luminosity varies slightly. When the diagonal separating the two gray zones is reached, the luminosity varies abruptly. In the example represented, the luminosity presents an upward step, since there is a transition from a 9% zone to a 36% zone.

Thus, to indicate underexposure, it is sufficient to detect an upwards luminance step. The detection of a downwards luminance step indicates overexposure.

Of course, such a decoy card may be provided with additional gray zones. In fact, it may be particularly useful to provide an 18% neutral gray zone. This neutral gray zone would be a diagonal strip separating the darker and lighter zones, whereby the luminance step detection method still works.

Figure 3B:
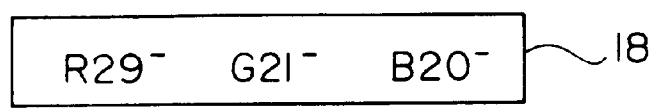
FIG. 3B represents an example of data display incorporating an indication obtained by using the reference card of FIG. 3A.

FIG. 3B represents an example of an indication of intentional over- or underexposure. In the window 18 showing the "transfer points", each RGB component is followed by the sign "−" in case of intentional underexposure, and by the sign "+" in case of intentional overexposure.

A drawback of the above passive reference or decoy cards is that their optical characteristics vary substantially with their viewing angle and with the incidence of ambient light upon them. This is essentially due to the difficulty in obtaining perfectly matte surfaces.

Figure 4A:
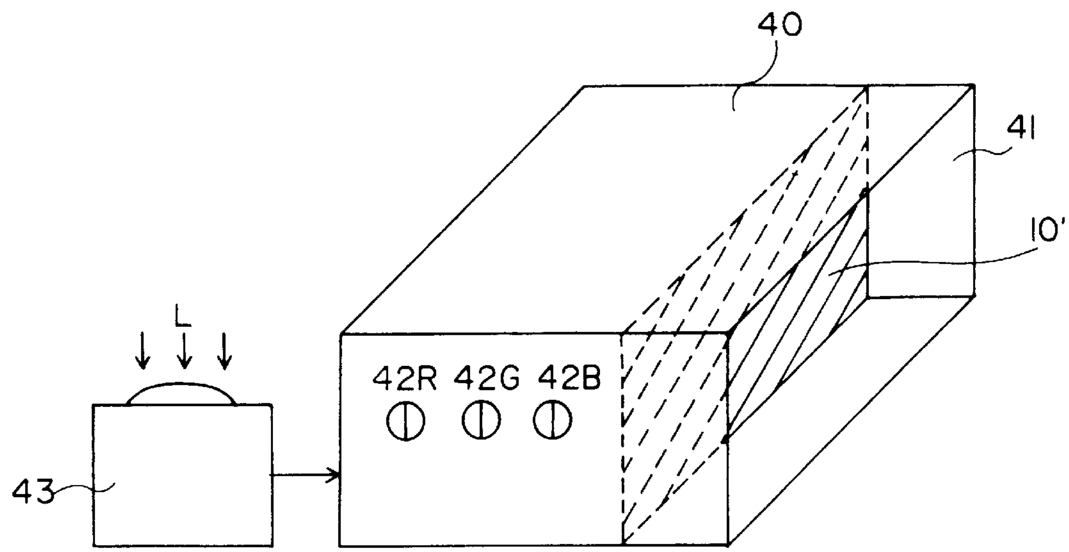
FIGS. 4A and 4B represent examples of active surfaces of the present invention.
Figure 4B:
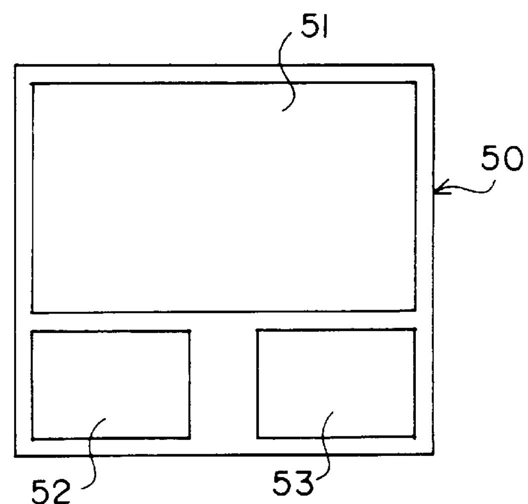

FIGS. 4A and 4B represent examples of "active reference surfaces" according to the present invention, which overcome this drawback.

In the example of FIG. 4A, the active surface 10' is constituted by a front diffusing display, for example a ground glass screen, of a projector 40. This display is preferably protected from parasite reflections by a peripheral lateral mask 41, which may also cover the front of the display and leave only a portion of this display visible through a central aperture (not shown). The optical characteristics of such an active reference surface will not vary with the viewing angle if the display screen is sufficiently diffusing, nor with the incidence of ambient light due to the mask.

The projector 40 has red, green and blue light sources (R, G, B) of adjustable intensity, for example light emitting diodes (LEDs),flash lights, or the like, as well as automatic (computerized) and manual means for controlling these sources. The manual means are controlled by knobs 42R, 42G, 42B.

A light detector 43 analyzes the incident light L in its three R, G, B spectral components, and transmits the data collected to an appropriately programmed microprocessor having adequate memory means, to control the light sources so as to generate on the screen a uniform luminance equivalent to that of a neutral gray card lit by the incident light. The screen will then serve as a conventional neutral gray reference surface.

By using the setting knobs 42R, 42G, 42B, the director of photography may modify this gray in order to obtain a desired effect on the screen, thus producing an "active decoy surface".

Since the final effects which will be obtained by using this decoy surface are complementary to those visible on the decoy surface, they may be difficult to evaluate.

To simplify such an evaluation, one may proceed, for example, as follows. Usually the scene filmed by a film camera is also filmed by a video camera. The video camera is often integral with the film camera, so that it films the same scene under the same conditions as the film camera. The image produced by such a video camera, filming the scene with the decoy surface, will be subjected to adjustments complementary to those achieved by the director of photography with knobs 42. The resulting processed image is displayed on a monitor where the director of photography will view in real time the results of his adjustments, as they will be caused by the use of the decoy surface.

In practice, if one of the RGB signals provided to the screen forming the decoy surface is increased by a specific relative value by operating a knob 42, the same RGB signal provided to the monitor is decreased by the same relative value. Such a system may be readily implemented by those skilled in the art with analog or digital circuitry.

This embodiment of an "active decoy surface" offers many alternatives. For example, instead of the projector in FIG. 4A, the screen of a lap-top computer could be used, as shown in FIG. 4B. This would enable displaying:

- in a zone 51, a uniform area that has been affected by the desired modification to the neutral gray,
- in a zone 52, the unprocessed image provided by the above video camera, and
- in a zone 53, the resulting image of zone 52 as modified by the use of the decoy surface (i.e. the image displayed on the above monitor).

Then, the lap-top screen itself constitutes the desired "active decoy surface". Of course an anti-reflection system, such as a peripheral mask, will be provided in order to avoid parasite reflections.

Like for the passive decoy cards, it may be useful to also display the neutral gray reference near the decoy display.

In order to calibrate the film scanner apparatus for the needs of the invention, the method described in British patent application 95 18215.0 filed by Kodak will be preferred. The calibration is carried out by using a reference film with three gray stripes in each image. The gray stripes are reproductions in ideal conditions of a 3% reflection value gray (black), a neutral 18% reflection value gray (gray), and a 90% reflection value gray (white).

An initial step in the calibration will involve running this reference film through the film scanner apparatus and analyzing the corresponding RGB video voltages for each stripe. The RGB video voltages are set at 0.03 V for the black stripe, at 0.25 V for the neutral gray stripe, and at 0.50 V for the white stripe. These settings are stored in the memory so as to be applied when the film scanner apparatus is used in calibration mode.

A second step in the calibration involves using a table providing the correspondence between the "transfer points" and video levels for each type of rawstock. As the type of rawstock usually appears on the edge of the film in a standardized code, a "Keylink" type system will automatically select the appropriate table in order to obtain the "transfer points" adapted to the rawstock being used.

These correspondence charts may be obtained by comparing the measurements made on the reference film with those made on similar reference films using different types of rawstock.

In a simplified system, a single table would be sufficient, corresponding to a mean value of the types of rawstock that may be used.

It should be understood that the invention is not limited to the use of a film chain as a source of video signals. The source can also be a video tape player, a film scanner of any type, or a video camera, or any other means for developing or storing video signals.

Having thus described at least one illustrative embodiment of the invention, various alterations, modifications and improvements will readily occur to those skilled in the art. Such alterations, modifications, and improvements are intended to be within the spirit and scope of the invention. Accordingly, the foregoing description is by way of example only and is not intended to be limiting. The invention is limited only as defined in the following claims and the equivalents thereto.

It is claimed:

1. An analysis method for cinematographic film using a film scanner for converting the images of the film into video images, the film scanner having a calibration mode providing a standardized video reproduction of films and a manual mode allowing the operator to adjust the film scanner for improving the visual quality of the video images it produces, comprising the following steps:

a) filming a reference surface under desired lighting conditions to produce a film portion;

b) using the film scanner in said calibration mode to convert the film portion into video images;

c) measuring the mean luminance and chrominance values of a portion of the reference surface in the video images produced in the calibration mode;

d) using the film scanner in the manual mode to convert the film portion into video images with desired luminance and chrominance adjustments;

e) measuring the mean luminance and chrominance values of a portion of the reference surface in the video images produced in the manual mode; and f) providing information on the mean values obtained in the manual mode relative to the mean values obtained in the calibration mode to adjust the video image of the film.

2. The film analysis method according to claim 1, wherein said desired luminance and chrominance adjustments are achieved to correct the video image of the reference surface so that it corresponds to a standardized video image of a neutral gray reference card.

3. The film analysis method according to claim 2, wherein the reference surface is a decoy surface having luminance and chrominance characteristics that are complementary to desired lighting effects.

4. The film analysis method according to claim 3, wherein the decoy surface is a passive decoy card having desired luminance and chrominance diffusion characteristics for the received light.

5. The film analysis method according to claim 4, wherein the decoy card has a first and a second gray zone, corresponding respectively to a predetermined underexposure and a predetermined overexposure.

6. The film analysis method according to claim 1, comprising the following steps for measuring the mean luminance and chrominance values:

choosing a reference pixel on the portion of the reference surface;

defining an equiluminance and equichrominance zone containing the reference pixel as well as adjacent pixels whose luminance and chrominance values are within a predetermined range about the values of the reference pixel; and producing the mean values for the pixels in the equiluminance and equichrominance zone.

7. The film analysis method according to claim 5, comprising the following steps:

measuring luminance values starting from a reference pixel in one of the first and second gray zones and moving towards the other gray zone;

stopping the measuring when a step in the measured luminance is encountered; and indicating overexposure or underexposure depending on the direction of the step.

8. The film analysis method according to claim 1, wherein the reference surface is an active surface comprised of a screen emitting uniform light with specific luminance and chrominance characteristics.

9. The film analysis method according to claim 8, including the following steps:

analyzing the luminance and chrominance characteristics of the ambient light of a scene, and producing on the screen a luminance equivalent to that of a neutral gray reference card illuminated by the ambient light.

10. The film analysis method according to claim 9, comprising the following steps:

further adjusting the screen illumination so that it provides luminance and chrominance characteristics complementary to desired lighting effects, and adjusting the luminance and chrominance values of the film scanner in the manual mode to correct the video image of said screen so that it corresponds to a standardized video image of a neutral gray reference card.

11. The film analysis method according to claim 10, wherein the complementary effects of the adjustments made to the screen illumination are reproduced in an image provided by a video camera filming said scene.

* * * * *